United States Patent [19]
Appling

[11] 3,838,201
[45] Sept. 24, 1974

[54] FREQUENCY SIMULATOR FOR EW TRAINING DEVICE

[76] Inventor: Bobby C. Appling, 207 Stephora Ave., Covina, Calif. 91724

[22] Filed: June 25, 1973

[21] Appl. No.: 373,074

[52] U.S. Cl. ................................................ 35/10.4
[51] Int. Cl. ............................................ G09b 9/00
[58] Field of Search .................................... 35/10.4

[56] References Cited
UNITED STATES PATENTS

| | | | |
|---|---|---|---|
| 3,445,577 | 5/1969 | Sperling et al. | 35/10.4 |
| 3,634,858 | 1/1972 | Mitchell | 35/10.4 X |
| 3,634,887 | 1/1972 | Buchholz | 35/10.4 X |

Primary Examiner—Malcolm F. Hubler
Attorney, Agent, or Firm—R. S. Sciascia; G. J. Rubens

[57] ABSTRACT

Frequency simulator apparatus for use with passive, electronic warfare (EW) training devices to render more effective and realistic signal recognition training of operators. A video switching network is connected between the output of a video tape recorder and the video circuits of a passive EW receiver set. Prerecorded radar video signals will not be displayed on the receiver set until the operator selects at the receiver set the proper frequency band and tunes the receiver to the proper frequency within that band to thereby actuate the switching network with a voltage indicating that the proper band has been selected and another voltage indicating that the proper frequency has been tuned to.

4 Claims, 3 Drawing Figures

FREQUENCY SIMULATOR FOR EW TRAINING DEVICE

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This application is related to application Ser. No. 140,902 filed May 6, 1971, now abandoned.

BACKGROUND OF THE INVENTION

The invention relates to apparatus used to train personnel to operate and monitor countermeasures receiving sets such as the AN/WLR-1 which is designed for installation in submarines, surface ships, or shore sites. The set is a high-resolution, high-sensitivity, superheterodyne receiver which performs rapid signal analysis functions by simultaneous direction finding, pulse analysis, and panoramic display. It is operable over a wide frequency range which is covered by a plurality of RF tuners which overlap in frequency, any one of which may be selected by appropriate band selector switches.

A video tape recorder can be used in conjunction with the receiver set to introduce prerecorded threat radar signals into the video circuits of the receiver set for operator signal recognition training. The radar signals thus introduced produce a display consisting of pulse width, pulse repetition frequency, and scan characteristics of the radar signals.

If the input radar signals are introduced directly into the video circuits of the receiver set, they will be displayed regardless of the frequency band and frequency selected. Consequently, frequency (and azimuth) of the signals must be voice annotated on one of the audio channels. This technique results in unrealistic training of personnel since they do not have to "search" for frequency to obtain a video presentation; that is, they need only observe the analysis display and listen to the above-mentioned voice annotations. Obviously more realistic training would be achieved by requiring an operator to tune to the frequency band and the frequency of the input signal before a display can be obtained.

Furthermore, existing frequency simulator devices are too complicated, heavy, large, and expensive for use in large numbers, especially in actual shipboard environments where space limitations are acute. These devices also often produce spurious RF radiation.

SUMMARY OF THE INVENTION

In electronic warfare training devices wherein prerecorded radar signals are applied to receiver apparatus for signal recognition training, switching apparatus are disclosed for rendering such training more realistic by displaying the input signals only when an operator selects the frequency band and tunes to the frequency corresponding to the signals. Frequency simulation is achieved by converting a prerecorded audio signal into a DC voltage corresponding to the frequency thereof and by comparing the DC voltage with DC voltages from a frequency potentiometer at the receiver set until coincidence is achieved. Frequency band simulation is achieved by converting a number of audio bursts, corresponding to the number of bands, into a like number of DC voltages and comparing them with various numbers of DC voltages from a band select switch at the receiver set until coincidence is achieved. Simultaneous receipt of frequency and frequency band coincidence signals as above actuates video switching apparatus which thereby passes prerecorded video signals to the receiver set for display thereof.

OBJECTS OF THE INVENTION

It is the primary object of the invention disclosed herein to improve the relevant state of the art by providing passive frequency simulator apparatus for use with EW training equipment to improve signal recognition training of operating personnel by making more realistic such training.

Other objects, advantages and novel features of the invention will become apparent from the following detailed description of the invention when considered in conjunction with the accompanying drawings.

DESCRIPTION OF THE PREFERRED EMBODIMENT

Figure 1:
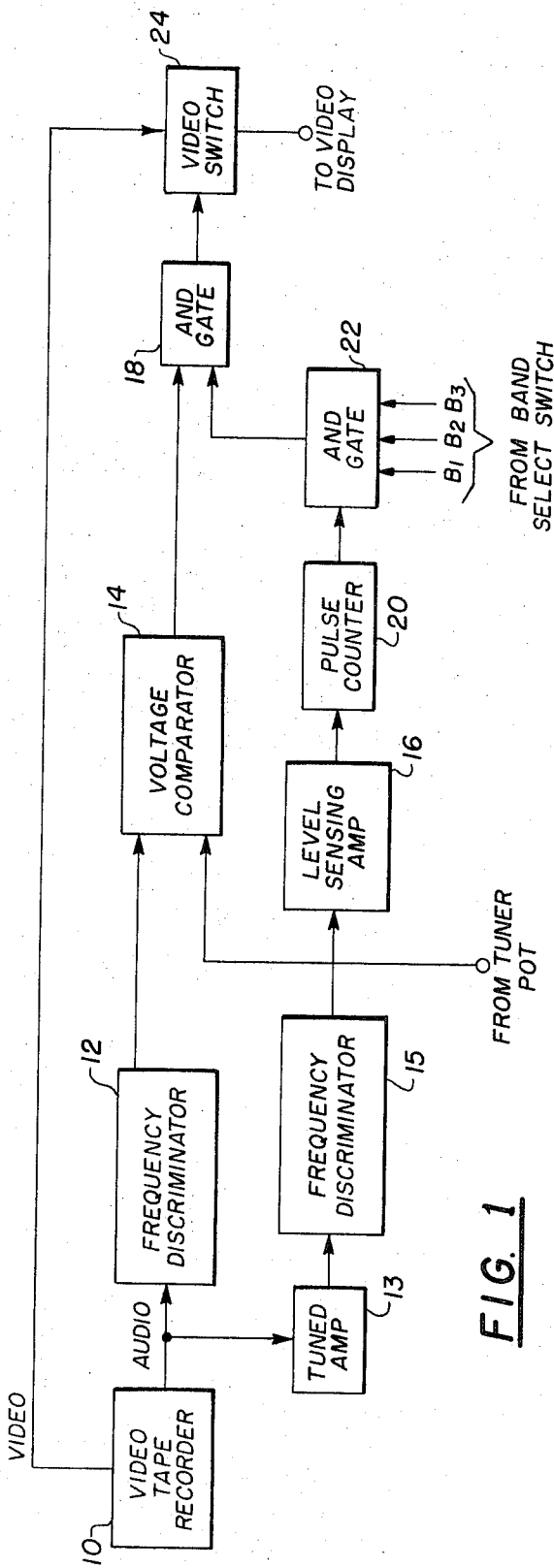
FIG. 1 is a simplified block diagram of a preferred embodiment frequency simulator apparatus embodying the inventive concept disclosed herein and for use with radar signal recognition training devices; and, FIGS. 2a and 2b is a detailed electrical schematic drawing of a more detailed embodiment of frequency simulator apparatus similar to that shown in FIG. 1.

FIG. 1 illustrates a novel frequency simulator device embodying the inventive concept disclosed herein and connected operationally to a conventional countermeasures receiver (not shown) such as the aforementioned AN/WLR-1. The receiver normally includes a video display device, a band select switch, and a tuner potentiometer. The frequency range is covered by nine RF tuners with overlap in frequency, and a band select switch can be used to select any one of the frequency bands which cover a frequency range of, for example, 100 to 11,000 megacycles. The tuner potentiometer can be used to tune to any frequency within the band selected. Frequency is indicated by a servo driven, direct reading counter.

As stated previously, prerecorded signals from a video tape recorder 10 are passed to the video display circuits of the receiver set by the switching action of the apparatus of FIG. 1. The frequency simulator device comprises a frequency discriminator 12 which is connected to an output audio channel of the video tape recorder.

The discriminator is connected at its output to a voltage comparator 14. The comparator 14 is also connected to the output of a frequency tuner potentiometer at the receiver set to receive a DC voltage therefrom proportional to the frequency being tuned to by an operator. The comparator 14 is connected at its output to an AND gate 18.

The audio output from the recorder 10 are also fed to a tuned amplifier 133 and to a frequency discriminator 15 which converts the audio into a DC voltage proportional to the frequency of the audio signal. The DC voltage is then coupled to a level sensing amplifier 16.

Figure 2A:
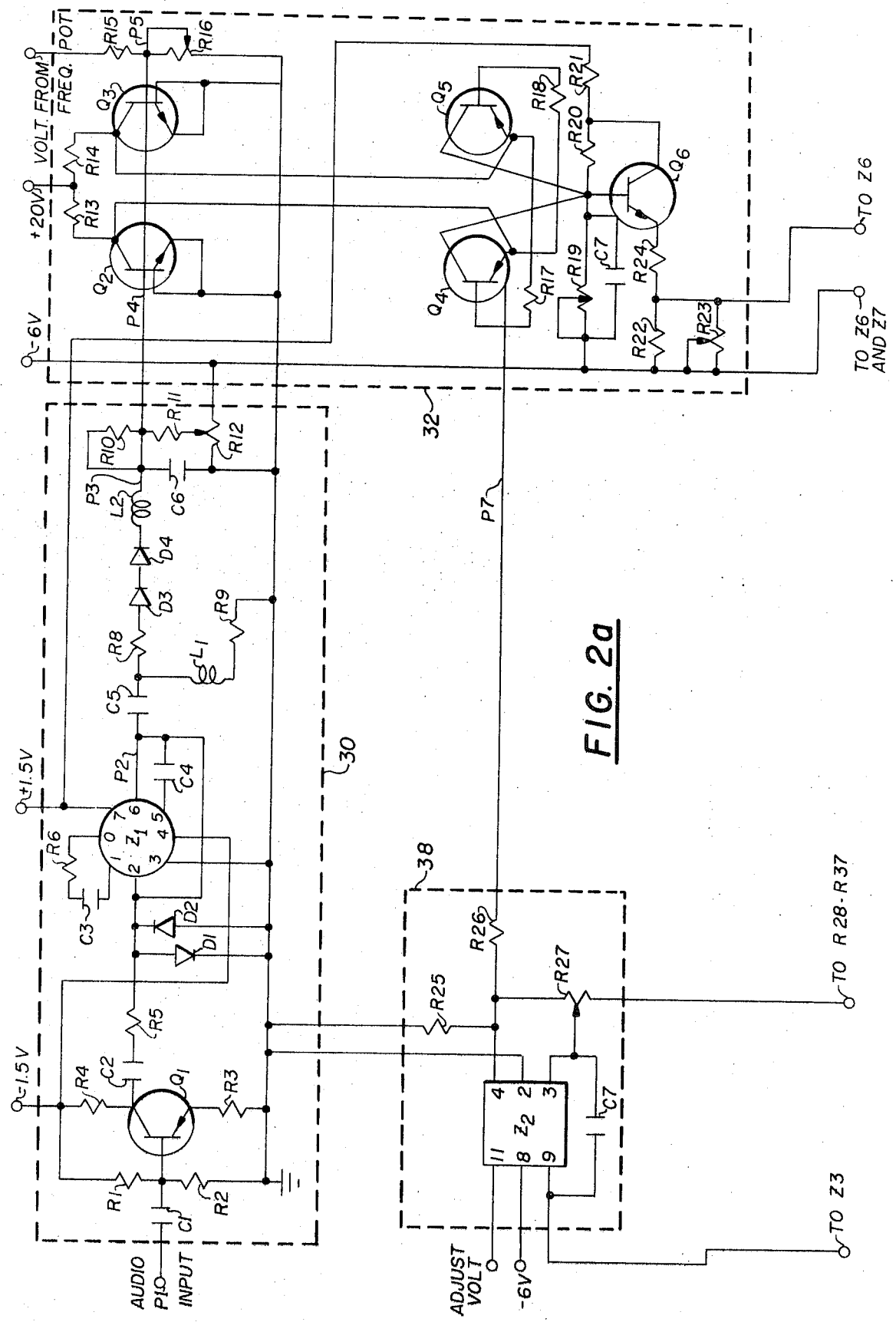
Figure 2B:
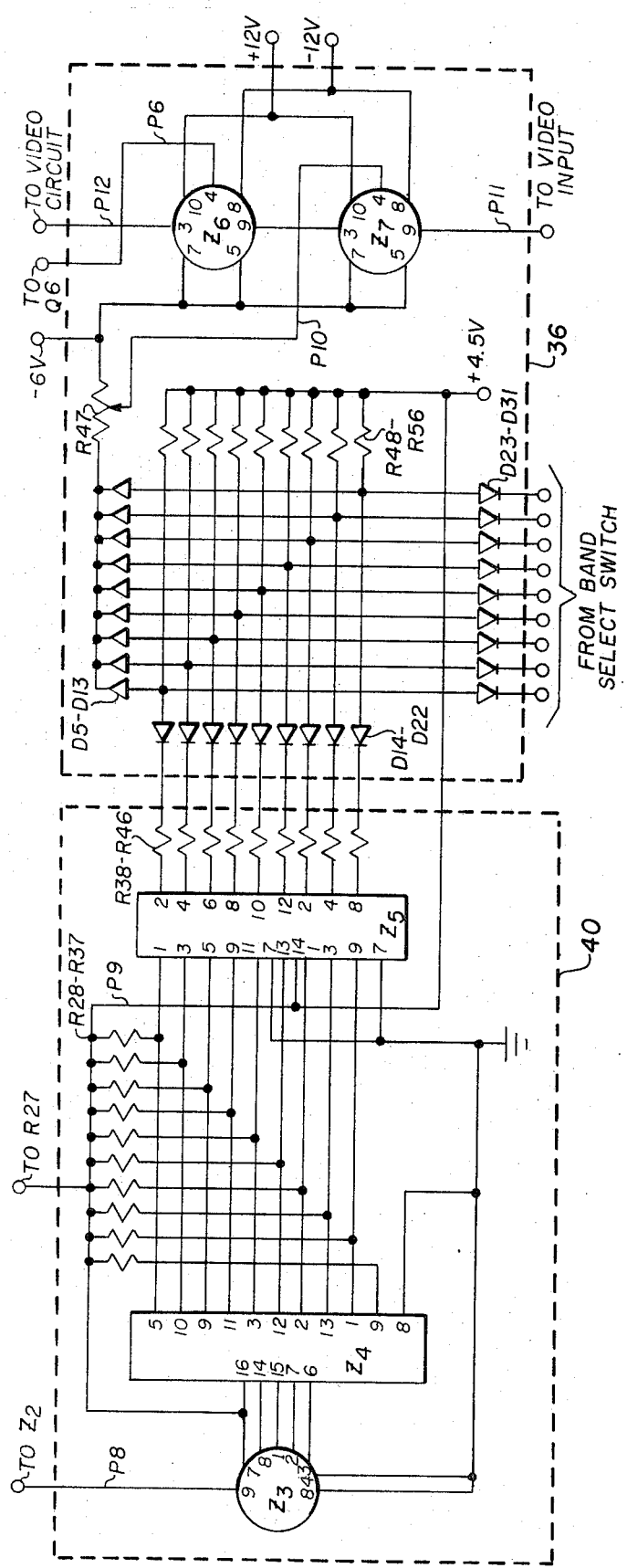

The output of the level sensing amplifier is fed to a pulse counter 20 whose output feeds an AND gate 22. The gate 22 also receives from the band select switch a plurality of DC voltages corresponding to the different frequency bands. In FIG. 2, only three bands, $B_1$, $B_2$, and $B_3$, are shown; however it should be appreciated that more than three bands could be encompassed by the receiver set, and that the AN/WLR-1 uses nine bands.

The output of the gate 22 is coupled to an AND gate 18 which, as previously mentioned, also receives the output of the comparator circuit 14. The gate 18 output is applied to the video switch 24 which also receives the prerecorded video signals from the recorder 10.

For optimum operation of the frequency simulator device, the frequency discriminators 12 and 15 should each have an input impedance which is compatible with the recorder 10, and their frequency range should be substantially equal to that of the receiver set and the recorder. The tuned amplifier 13 should have a narrow bandpass to block undesired signals from the discriminator 15.

The voltage comparator 14 can comprise a differential amplifier stage which drives the coincidence or AND gate 18. FET inputs can be used to eliminate any loading effects on the inputs, and the output can be taken from an emitter-follower to enhance impedance matching considerations. Although a single, integrated circuit comparator can be used effectively, consideration should be given to the fact that many so-called comparators are in fact sensing amplifiers which cannot be used within the inventive concept disclosed herein.

The pulse counter circuit can comprise a decade counter 20 which converts an input of trigger pulses from the level-sensing amplifier 16 into a logic output, e.g., one-on, eight-off. The decade counter feeds a converter which converts a parallel, binary output to, for example, a one-of-nine output. Proper logic sense can be achieved by including an inverter in the counter circuit.

The AND gate 22 receives a DC voltage from the pulse counter 20 and also a plurality of DC voltages from the band select switch of the receiver set. As mentioned previously, each of the DC voltages from the band select switch corresponds to a different frequency band. An AND or coincidence condition is obtained when the operator selects the band select voltage corresponding to the frequency band of the prerecorded signal being received.

The coincidence output of the gate 22 is fed to the AND gate 18 as is the coincidence output of the comparator 14 whereby when both inputs exist simultaneously, the gate 18 produces an output voltage which activates the video switch 24. When actuated, the switch allows the video signal to pass to the video circuits since the operator has now selected the correct frequency band and also the correct frequency, corresponding to the prerecorded video signals.

In operation, frequency simulation is achieved as follows. A prerecorded audio signal from an audio track of the video tape recorder 10 is applied to the input of the frequency discriminator 12. In the discriminator, the signal is voltage limited and amplified to produce a constant amplitude, AC signal which is independent of frequency. The response of an LR discriminator then produces a different amplitude for every different frequency. The response is filtered and half-way rectified to thus produce a non-modulated, DC output voltage whose amplitude has, for example, a one-to-one correspondence with the associated frequency input.

Although particular values of correspondence may be selected by choosing appropriate circuit components, the device has been found to operate effectively for nominal values of 200-Hz to 5-Hz and 4-volts to 15-volts, respectively. Thus, if for example, a 200-Hz signal were applied to the frequency discriminator, a 4-volt signal would be realized at the output thereof.

The DC output voltage from the frequency discriminator 12 is fed to the voltage comparator 14 simultaneously with a DC voltage from the tuner potentiometer of the countermeasures receiver. The DC voltage from the receiver has a range corresponding to the frequency range of the receiver set from the bottom of the band to the top of the band. In the comparator, the two voltages are amplified, compared, and then coupled through an emitter-follower stage to produce at the output of the comparator a low-level coincidence signal when the two DC voltages are substantially equal and a high-level signal when they are not equal.

The low-level coincidence signal is coupled to the AND gate 18 such that the coincidence signal will function as an "on" switching voltage only when an operator has tuned to a DC voltage at the receiver tuner potentiometer which corresponds to a frequency substantially equal to the audio frequency of the prerecorded signal.

Frequency band simulation is achieved as follows. A series of, for example, 5-Khz bursts are prerecorded and the audio signal is coupled to the tuned amplifier 13 which would be a 5-Khz device. If the signal is 5-Khz, it will be passed and fed to the frequency discriminator 15 which converts it into a DC voltage.

The DC voltage is applied to the level-sensing amplifier 16, which can comprise a Schmitt trigger, and which in turn triggers the pulse counter 20. Each burst received will advance the counter once. If a decade counter is used, one count will be used as a reset position and the other nine counts will be ANDED with the nine voltage inputs from the band select switch. When an AND condition is achieved, gate 22 will produce an outut which is then ANDED at the gate 18 with the output of the comparator 14.

Upon simultaneous receipt of the two inputs, the AND gate 18 produces an output which energizes the video switch 24 whereby the switch passes the video signal to the video circuits of the receiver set.

It can be appreciated that in performing the acts of selecting the appropriate frequency band and tuning to the appropriate frequency in that band, the operator will have essentially reacted as though he were tuning in on an incoming RF signal in an actual operational situation whereby signal recognition training is obviously made more realistic and meaningful.

FIG. 2 is an electrical schematic drawing of another embodiment of the present inventive concept. The embodiments shown in FIGS. 1 and 2 are very similar, however, FIG. 2 shows in more detail the electrical circuitry involved in a typical apparatus. It can be appreciated that since the operation is similar to that of FIG. 1, the description of FIG. 2 can be kept to a minimum.

In FIG. 2, the audio input is applied at the point $P_1$ to the discriminator circuit 30. The essence of the circuit comprises the LR circuit which is preceeded by amplification and voltage limiting stages and which is followed by a half-wave rectifier and a filter. The audio input after being limited and amplified appears as a constant amplitude AC signal at $P_2$, regardless of frequency.

The LR discriminator produces a different amplitude for each different frequency which is then filtered and half wave rectified. This produces at $P_3$ a non-modulated DC voltage whose amplitude has a one-to-one correspondence with an associated frequency input.

The DC voltage is coupled to the comparator 32 which also receives a voltage from the frequency potentiometer at the receiver set. The two voltages are amplified by the differential amplifier (FET's) and compared in the following stage. The output exists at $P_6$ as, for example, a low-level when they are substantially equal, or as a high-level when they are different.

The low-level coincidence signal is coupled to the switching circuit 36 only when an operator has tuned the frequency potentiometer to a frequency corresponding to the frequency of the prerecorded signals.

The voltage from the comparator, after it is inverted through the FET, is coupled at $P_7$ to the level sensing amplifier 38, which also receives an adjustable DC voltage as an input. Depending upon the setting of the adjustable level, a given input from the comparator will be smaller and will cause the sensing amplifier to produce a high-level output.

A larger level from the comparator will produce a low-level output. Thus bursts of audio frequency from the recorder which raise the level of the discriminator will lower the input to the counter 40 and will produce high-level triggers from the sensing amplifier.

The triggers are coupled to the counter 40 and advance the count as follows. The input to the counter (decade) at $P_8$ will be a low-level except when a high audio frequency burst, used for band simulation, causes a temporary high-level. The high-level is approached with the necessary rise time and exists in excess of the minimum required time to advance the decade counter one step.

The output of the decade counter comprises a parallel, binary voltage (high-level "on") which is converted to an exclusive one of many voltages (low-level "on"). Each time a trigger advances the binary count by one, the converter output at $P_9$ switches to the next sequential "on" output. Since the output is a low-level "on" logic signal, it is converted by an inverter to a high-level "on" signal before it leaves the counter circuit and enters the switching circuit.

In the switching circuit, the nine inputs from the counter are compared to nine, band select, voltages from the receiver set, only one of which will be energized at any time. The output from the nine AND gates will be sufficient at $P_{10}$ to energize the corresponding video switch only when the band select voltage corresponding to the counter voltage is selected by an operator, i.e., the receiver set band select switch must be positioned to the band corresponding to the prerecorded number of high audio frequency bursts.

Thus, if an operator selects the correct frequency band, one video switch will be turned on. If he then tunes to the correct frequency, the comparator output will energize the other video switch. If both switches are energized simultaneously, the video at $P_{11}$ from the recorder video track will be passed to $P_{10}$ and the receiver set video circuits.

By way of example, the following electrical and integrated and hybrid components could be used in the circuit of FIG. 2:

| | |
|---|---|
| C1:60-mf, 50 VDC. | C5:.04-mf, 200 VDC. |
| C2:1-mf, 35 VDC. | C6:.22-mf, 100 VDC. |
| C3:100-pf, 50 VDC. | C7:.005-mf, 25 VDC. |
| C4:20-pf, 30 VDC. | C8:15-mf, 25 VDC. |
| R1:200K, ¼ W. | R38–46:100 ohm, 1 W. |
| R2:10K, ¼ W. | R47:2.5K, Var. |
| R3:1K, ¼ W. | R49–56:220 ohm, ¼ W. |
| R4:15K, ¼ W. | |
| R5:5k, ¼ W. | D1–2:1N816 |
| R6:1.5K, ¼ W. | D3–4:10D4 |
| R7:10K, ½ W. | D5–31:IN4151 |
| R8:1K, ½ W. | |
| R9:780 ohm, ½ W. | L1–2:5-mili-henry |
| R10:2M, ¼ W. | |
| R11:430K, ¼ W. | Q1:2N1415 |
| R12:10K, Var. | Q2 & Q3:FET, N type, Dual gate, Mod 276-113. |
| R13:1.2K, ½ W. | |
| R14:1.2K, ½ W. | Q4–5:2N3638A |
| R15:20M, ½ W. | Q6:2N 1308 |
| R16:500K, Var. | |
| R17:100K, ¼ W. | Z1 Motorola MC 1709 CG |
| R18:100K, ¼ W. | Z2, 9 Fairchild SH3002 |
| R19:1M, Var. | Z3 Motorola MC 1710 CL |
| R20:3.3M, ¼ W. | Z4 Fairchild CuL 9458 |
| R21:1/9K, 1 W. | Z5 Fairchild Cul 9960 |
| R22:1.9K, 1 W. | Z6, 7 Fairchild TTul 9016 |
| R23:25K, Var. | |
| R24:1.9K, 1 W. | |
| R25:15K, ½ W. | |
| R26:10K, ½ W. | |
| R27:10K, Var. | |
| R28–37:10K, 1 W. | |

The tapes used by the recorder 10 can be produced as follows from a library of master tapes of selectively predetermined threat radar signals (video). First, the video from the master tapes is recorded on the tape in the recorder. A microphone is then connected to an audio track of the recorder to voice annotate the tape with appropriate training information. An audio signal generator is then connected by means of a normally-open push-button switch connected to another audio track of the recorder. With the audio signal generator set at, for example, a 5-Khz, the operator of the recorder records nine 5-Khz bursts. He then switches the audio signal generator to, for example, 1-Khz and begins recording it on the audio track. At this time, he also begins the duping of the video and the audio voice annotation. Other bursts are recorded during the production and different video is recorded with the appropriate audio frequencies. Once a tape is produced, many others can be duped, track for track, from it.

When the video tape recorder is started, the operator of the countermeasures receiving set begins to search for the signal which, unknown to him, is in the ninth frequency band. Assume that he has switched through eight of the nine bands without any results, and he now switches to band nine. The switch output will comprise nine DC voltages which will be ANDED with the nine DC voltages from the pulse counter 20 which has counted nine 5-Khz bursts. The operator will then tune the frequency potentiometer until an AND condition is produced at the gate 18. The operator can now visually see the video display and by looking at the frequency counter he can read the RF frequency to which he apparently has tuned. However, during the operation of the tape, the operator has been required to switch bands, frequencies, or both before he can see the desired video.

Thus, it can be seen that a new and novel frequency simulator for countermeasures receiving sets has been disclosed which can be used to make more effective the use of passive EW equipment as training devices. Previously EW equipment operators could see video on any channel at any frequency reading, thereby making somewhat unrealistic signal recognition training of operators. With the present device an operator will see video only when he has selected the correct band and the correct frequency within that band. Furthermore if the reaction time of operators is being analyzed, this critical factor can be accurately measured. Finally, the frequency capability described herein can be achieved without introducing RF radiation, high cost, bulkiness, and impractical complexity into existing systems.

Alternatively it should be noted that the audio track could be annotated with digital information which if decoded through another section similar to the pulse counter 20 could select a discrete section of the frequency band, and a single dual-control video switch could be used effectively.

Obviously many modifications and variations of the present invention are possible in the light of the above teachings. It is therefore to be understood that within the scope of the appended claims the invention may be practiced otherwise than as specifically described.

What is claimed is:

1. EW radar signal recognition training apparatus comprising:
   a source of prerecorded radar signals comprising video signals and audio frequency signals recorded simultaneously and preceded by a preamble comprising a train of high-frequency, audio bursts, said source having a video output and an audio output;
   passive EW receiver means comprising video display means, frequency tuner means for providing a DC voltage proportional to the frequency setting thereof, and frequency band selector means for providing a DC signal corresponding to the frequency band setting thereof;
   video switch means connected between the video output of said source and the input of said video display means;
   frequency discriminator means connected to the audio output of said source and being responsive to said train of high-frequency, audio bursts to produce a first DC output voltage each time a burst is coupled thereto, and further being responsive to said audio frequency signals to produce a second DC output voltage proportional to the frequency thereof;
   comparator means connected to the outputs of said frequency tuner means and said frequency discriminator means to compare said second DC output voltage with said DC voltage from said tuner, whereby said comparator means produces a first low-level signal when said second DC output voltage and said DC voltage are substantially equal;
   level-sensing amplifier means connected to the output of said frequency discriminator means and being responsive to said first DC output voltage to produce a high-level trigger output each time one of said bursts is sensed;
   binary counter means connected to the output of said amplifier means for counting said triggers and for producing an output count proportional to the number of said triggers coupled thereto;
   first logic gate means connected to the outputs of said binary counter means and said frequency band-selector means to produce a second low-level signal when said output counts and the output signals from said band selector means are equal; and,
   second logic gate means connected to the output of said comparator means and said first logic gate means to produce an output when said first and second low-level signals are coupled thereto in coincidence,
   said output being coupled to said video switch means to energize said switch means to an on condition whereby said video output is coupled to said video display means.

2. The apparatus of claim 1 wherein said frequency discriminator means includes an LR circuit preceded by amplification and voltage limiting stages and followed by rectifier and filter stages.

3. The apparatus of claim 1 wherein said comparator means includes a differential amplifier stage which drives a coincidence gate having an emitter follower connected at its output.

4. Passive apparatus for training radar personnel in signal recognition and comprising:
   a source of prerecorded signals of interest;
   operator-controlled receiver means for displaying said signals;
   switch means connected between said source and said receiver means and comprising:
   first discriminator and comparator means connected to an audio output of said source and to frequency potentiometer means of said receiver means for producing a first coincidence signal when an operator tunes said potentiometer means to a frequency substantially equal to that of said first audio output;
   second discriminator and counter means connected to said audio output for producing a pulsed output corresponding to the number of high-frequency audio bursts received from said audio output;
   first coincidence means connected to the output of said second discriminator and counter means and to the output of band select switch means of said receiver set for producing a second coincidence signal when an operator tunes said switch means to the frequency band corresponding to that of said bursts;
   second coincidence means connected to the outputs of said first discriminator and comparator means and said first coincidence means for producing a third coincidence signal wehn said first and second coincidence signals are received simultaneously; and,
   video switch means connected between a video output of said source and video display circuits of said receiver means and being responsive to said third coincidence signal to pass video signals to said receiver set for display thereof.

* * * * *